(12) United States Patent
Bader

(10) Patent No.: US 9,867,151 B2
(45) Date of Patent: Jan. 9, 2018

(54) PACKET STRUCTURE

(71) Applicant: KING ABDULLAH UNIVERSITY OF SCIENCE AND TECHNOLOGY, Thuwal (SA)

(72) Inventor: Ahmed Bader, Tla'a Al-Ali District (JO)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 49 days.

(21) Appl. No.: 14/695,018

(22) Filed: Apr. 23, 2015

(65) Prior Publication Data

US 2015/0341871 A1    Nov. 26, 2015

Related U.S. Application Data

(63) Continuation of application No. PCT/IB2013/003023, filed on Oct. 22, 2013, and a continuation-in-part of application No. PCT/IB2013/003098, filed on Nov. 8, 2013.

(60) Provisional application No. 61/717,289, filed on Oct. 23, 2012, provisional application No. 61/724,917, filed on Nov. 10, 2012.

(51) Int. Cl.
| | |
|---|---|
| *H04W 52/46* | (2009.01) |
| *H04W 52/10* | (2009.01) |
| *H04W 74/08* | (2009.01) |
| *H04W 84/18* | (2009.01) |
| *H04L 5/00* | (2006.01) |

(52) U.S. Cl.
CPC ........... *H04W 52/46* (2013.01); *H04W 52/10* (2013.01); *H04W 74/0866* (2013.01); *H04L 5/0053* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2007/0147322 A1* | 6/2007 | Agrawal | H04W 52/325 370/338 |
| 2013/0301633 A1* | 11/2013 | Brown | H04J 3/0647 370/350 |

OTHER PUBLICATIONS

An Efficient Multi-Carrier Position-Based Packet Forwarding Protocol for Wireless Sensor Network; Version 1 Ahmed Bader, Karim Abed-Meraim, Mohamed-Slim Alouini, https://arxiv.org/abs/1108.1914v1;, Aug. 9, 2011.*

(Continued)

*Primary Examiner* — Gary Mui
(74) *Attorney, Agent, or Firm* — Patent Portfolio Builders PLLC

(57) ABSTRACT

A source node in a multihop network determines whether to transmit in a channel based on whether the channel is occupied by a packet transmission with a large number of relays; whether the source node is in the data tones back-off zone; and the source node is in the busy tone back-off zone. A multihop network transmits a packet including a RACH area and a hop number. The RACH area includes a list of subcarriers. A source node in the network dynamically determines the size of the RACH area. A node in the network performs an open-loop transmit power control.

41 Claims, 9 Drawing Sheets

Field containing hop number

(56) References Cited

OTHER PUBLICATIONS

Technical Report: Multi-Carrier Position-Based Packet Forwarding Protocol for Wireless Sensor Networks; Version 2 Ahmed Bader, Karim Abed-Meraim, Mohamed-Slim Alouini; https://arxiv.org/abs/1108.1914v2; Aug. 14, 2011.*

Technical Report: Multi-Carrier Position-Based Packet Forwarding Protocol for Wireless Sensor Networks; Version 3 Ahmed Bader, Karim Abed-Meraim, Mohamed-Slim Alouini; https://arxiv.org/abs/1108.1914v3; Sep. 7, 201.*

An Efficient Multi-Carrier Position-Based Packet Forwarding Protocol for Wireless Sensor Network; Ahmed Bader, Karim Abed-Meraim, Mohamed-Slim Alouini; IEEE Transactions on Wireless Communications ( vol. 11, Issue: 1, Jan. 2012 ).*

Bader, A., "Commercial Multihop Networks," 2010 IEEE 17th International Conference on Telecommunications, Apr. 4, 2010, pp. 316-323.

Clancy, T.C., et al., "Security in Cognitive Radio Networks: Threats and Mitigation", 3rd International Conference on Cognitive Radio Oriented Wireless Networks and Communications, 2008, Crowncom 2008, IEEE, May 15, 2008, pp. 1-8.

Communication pursuant to Rule 164(2)(b) and Article 94(3) EPC in related EP Application No. 13 840 149.2, dated May 18, 2017.

International Search Report in related International Application No. PCT/IB2013/003023, dated May 26, 2014.

International Search Report in related International Application No. PCT/IB2013/003098, dated Aug. 11, 2014.

Korkmaz, G., et al., "Urban Multi-Hop Broadcast Protocol for Inter-Vehicle Communications Systems", Proceedings of the ACM International Workshop on Vehicular Ad Hoc Networks, Philadelphia, PA, USA, Oct. 2004, pp. 76-85.

Ohno, K, et al. "Detection and Avoidance Technique for UWB Radio Interfering to OFDM System Using Guard Interval", IEEE 20th International Symposium on Personal, Indoor and Mobile Radio Communications (PIMR 2009), IEEE, Piscataway, NJ, USA, Sep. 13, 2009, pp. 963-967.

Tseng, Y.-C., et al., "Adaptive Approaches to Relieving Broadcast Storms in a Wireless Multihop Mobile Ad Hoc Network", IEEE Transaction on Computers, IEEE Service Center, Los Alamitos, CA, US, May 2003, vol. 52, No. 5, pp. 545-557.

Written Opinion of the International Searching Authority in related International Application No. PCT/IB2013/003023, dated May 26, 2014.

Written Opinion of the International Searching Authority in related International Application No. PCT/IB2013/003098, dated Aug. 11, 2014.

Xu, J., et al., "Towards Analysis of Intra-flow Contention in Multi-hop Wireless Networks", Sixth International Conference on Mobile Ad-Hoc and Sensor Networks (MSN), Dec. 12, 2010, pp. 176-184.

* cited by examiner

Field containing hop number

PACKET STRUCTURE

CLAIM OF PRIORITY

This application is a continuation of PCT Application No. PCT/IB2013/003023, filed Oct. 22, 2013, and a continuation of PCT Application No. PCT/IB2013/003098, filed Nov. 8, 2013, and claims the benefit of prior U.S. Provisional Application No. 61/724,917, filed on Nov. 10, 2012, and U.S. Provisional Application No. 61/717,289, filed on Oct. 23, 2012, each of which is incorporated by reference in its entirety

TECHNICAL FIELD

The present invention relates to a multihop network such as a wireless sensor network, and a scheme for a node in the network to assess a channel.

BACKGROUND

Mobile multihop networks have been considered lately as viable alternatives for the delivery and sharing of multimedia content between users. Performance of such networks is typically measured in terms of conflicting objectives, namely: end-to-end latency, end-to-end energy consumption, and network throughput. Subsequently, this calls for a packet delivery protocols which are able to establish a careful balance between these objectives. Recently, a packet forwarding protocol has been developed to meet such objectives. See Bader, Ahmed et al., "An Efficient Multi-Carrier Position-Based Packet Forwarding Protocol for Wireless Sensory Network," IEEE Transaction on Wireless Communications, Volume 11, no. 1 (January 2012), the content of which is incorporated by reference in its entirety.

For example, the protocol is built using orthogonal frequency division multiplexing (OFDM) for the physical (PHY) layer. Furthermore, the protocol utilizes position-based channel access techniques in conjunction with the OFDM PHY. This allows all eligible relays at a given hop to access the channel concurrently. Due to this property, the protocol is labelled as "multi-relay." The protocol is indifferent to mobility since it does not mandate relays to have knowledge of the network topology. The use of OFDM makes it also quite resilient to fast fading environments and thus well-suited for mobility.

SUMMARY

One aspect of present invention provides a source node in a multihop network having a circuit that determines whether a channel is occupied by a packet transmission meeting predetermined criteria; wherein the source node determines whether to transmit in the channel based on the determination that the channel is occupied by a packet transmission meeting predetermined criteria; and wherein the criteria is based on a normalized auto-covariance of the power spectral density (PSD) of a total interference signal.

In another aspect of the present invention, the source node further determines whether it is in a data back-off zone by detecting data tones, and determines whether to transmit in the channel based on whether the node is in the data back-off zone. Typically, data tones correspond to subcarriers. Busy tone, however, may be of a single subcarrier dedicated to carrying the busy tone.

In another aspect of the present invention, the source node further determines whether it is in a busy tone back-off zone by detecting a busy tone, and determines whether to transmit in the channel based on whether the node is in the busy tone back-off zone.

In another aspect of the present invention, the source node transmits in the channel in a case that the channel is not occupied by a packet transmission meeting the predetermined criteria, the source node is not in the data tones back-off zone, and the source node is not in the busy tone back-off zone.

In another aspect of the present invention, the source node listens to the channel for an extended period and re-assess in a case that the channel is occupied by a packet transmission meeting the predetermined criteria, the source node is not in the data tones back-off zone, and the source node is in the busy tone back-off zone.

In another aspect of the present invention, the source node extracts a destination position from the busy tone, and transmits in the channel if an angle between the source node's destination and that of an ongoing transmission is $>\pi/2$, in a case the source node is in the data tones back-off zone, and the source node is in the busy tone back-off zone.

In another aspect of the present invention, the source node does not transmit in a channel in a case that the channel is not occupied by a packet transmission meeting the predetermined criteria, the source node is not in the data tones back-off zone, and the source node is in the busy tone back-off zone.

In another aspect of the present invention, the source node transmits in the channel in a case that the channel is occupied by a packet transmission meeting the predetermined criteria, the source node is in the data tones back-off zone, and the source node is not in the busy tone back-off zone.

In another aspect of the present invention, the source node does not transmit in the channel in a case that the channel is not occupied by a packet transmission meeting the predetermined criteria, the source node is in the data tones back-off zone, and the source node is in the busy tone back-off zone.

One aspect of present invention provides a multihop network having a plurality of nodes. The nodes may be a source, a destination, or a relay which both receives and transmits data. The data includes a packet having a random access channel (RACH) area and a hop number.

The RACH area includes a list of subcarriers and a relay number. A node, such as a relay, randomly selects one of the subcarriers and modulates it with a time-domain signal.

A node (such as a relay) of the multihop network receiving the packet extracts the relay number, and thereby obtains the number of prior relays. Further, the node scans the subcarriers, and, in a case that a subcarrier having an energy level meeting or exceeding a predetermined amount is detected, the number of relays is incremented.

Further, the node in the multihop network is an OFDM wireless communication device.

In another aspect of the present invention, a source node of the multihop network dynamically allocates a size of the RACH area. The node listens to a RACH area during a packet transmission at a second hop for a number of nodes of the second hop. The node receives a number of nodes at a destination stage transmitted by a destination node. The source node determines a size of the RACH area based on the number of nodes of the second hop and the number of nodes at the destination stage.

Further, the size of the RACH area set is constant for a plurality of hops.

In another aspect of the present invention, a relay of the multihop network scans the subcarriers in a RACH area to estimate a number of previous-hop relays. The relay further receives or transmits a packet including a hop number. The node determines a transmit power level based on the number of previous-hop relays and the hop number.

Further, such determination is made using a lookup table.

DETAILED DESCRIPTION OF THE SYSTEM

Figure 1:
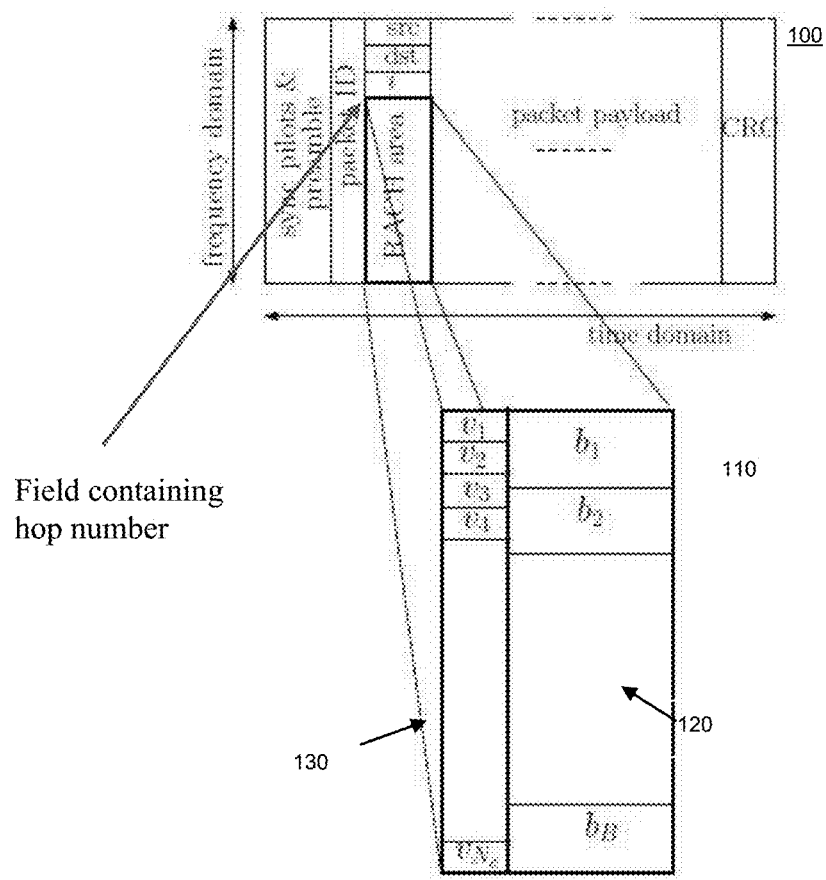
FIG. 1 illustrates a packet having a RACH area.

A multihop network includes a plurality of communication devices. An example is a wireless communication device. In a wireless sensor network, each of the communication devices is also a sensor.

The communication device is referred to as a node. A node transmitting data is a source node. Nodes that transmit or retransmit the data are also called relays.

A source node may not able to estimate the number of relays in the nearby ongoing packet transmission for the following reasons:

1. Current known packet structure does not provide information for such estimation. The estimation of the number of relays requires an "improved packet structure" such as one described in 61/717,289, filed Oct. 23, 2012, incorporated by reference in its entirety.

2. To exploit the improved packet structure, a node should switch to coherent channel assessment mode, i.e. it should synchronize with the ongoing packet transmission. This is typically a less-efficient method of channel assessment.

3. The source node will be able to synchronize to the ongoing packet transmission only if it lies inside the coverage perimeter shown in FIG. 4 below. This is a case which does not occur very often.

4. Furthermore, one aspect of present invention is directed to cases where a source node lies inside one or both of the back-off zones but outside the coverage perimeter (discussed below).

Consequently, a source node utilizes a multi-stage channel assessment scheme:

1. The classical non-coherent energy detection method, whereby the node measures the energy on the data tones as well as the busy tone.

2. The source node performs the normalized auto-covariance computation described below to estimate whether it is in the vicinity of a packet transmission with a large number of relays. It will not be able to estimate how many relays there are, but just determine whether it is a large number or not, which is sufficient to make an educated decision. This is also a non-coherent method, which makes sense to use here, since the node may typically be outside the coverage perimeter of the ongoing transmission, i.e. it will not be able to synchronize with that transmission.

3. The third stage is reverted to only in certain scenarios as explained in the decision table below. In this stage, the source node extracts the position of the destination from the busy tone signal.

Aspects of present invention provide, inter alia, enhancements in the packet structure which enable dynamic allocation of resources throughout the packet forwarding process. One aspect provides nodes with the ability to closely estimate the number of relays of the ongoing packet transmission. Another aspect provides a dedicated field for the hop number. The enhancements allow a source node to perform dynamic allocation of random access channel (RACH) slots, and allow relays subsequent to the source node to perform open-loop power control.

The ability of nodes to estimate the number of relays at a given hop helps to understand the underlying node density. With this, nodes are able to undertake well-informed and more efficient resource allocation approaches. For instance, the nodes are now able to adjust the size of the RACH area in a way that does not compromise end-to-end delay performance but achieves better L2 throughput. (I.e., Layer 2 of the 7-layer OSI network model. Layer 2 corresponds to the Data Link layer.) Similarly, an open-loop power control scheme that is aware of the underlying density can reduce energy consumption while maintaining a minimum level of end-to-end delay.

The improved packet structure is illustrated in FIG. 1. The packet 100 introduces a separate field for the hop number. See FIG. 1, "i." The source node sets the value of this field to 1. Every hop, relays increment this field by 1. Thus, the packet is relayed from source to destination over multiple hops, nodes in between the source and destination act as repeaters. The number of hops corresponds to the number of times the packet was transmitted before it reached the destination. So, indeed the transmission from the source node comprises the first hop. The transmission one of whose receivers is the destination is the last hop.

The other modification is done to the first OFDM symbol of the RACH area (110). The RACH 110 includes slots 120 and subcarriers 130.

As shown in the Figure, there are $v_{N_c}$ subcarriers. Each subcarrier is now accessible to relays. Each relay randomly selects one of those subcarriers and modulates it with a time-domain pulse. Next-hop nodes will scan through $v_{N_c}$ subcarriers using a simple energy detector. Detection of any subcarrier holding substantial energy will increment the hop number by one. A subcarrier is considered to have been modulated by a relay if the energy measured on that subcarrier exceeds a certain preset threshold. The value of such a threshold is determined according to the desired probability of detection and probability of false alarm.

For example, a multihop network may have multiple relays concurrently transmit the same packet. E.g., in the $4^{th}$ hop of the packet towards the destination, 8 relays may be concurrently transmitting the packet. What they will do is to increment the hop number field in the packet structure by 1 such that the field contains the value 5. A receiver now will utilize the information on the $v_{N_c}$ subcarriers and will reach the conclusion that there were 8 relays in the $4^{th}$ hop.

Figure 2:
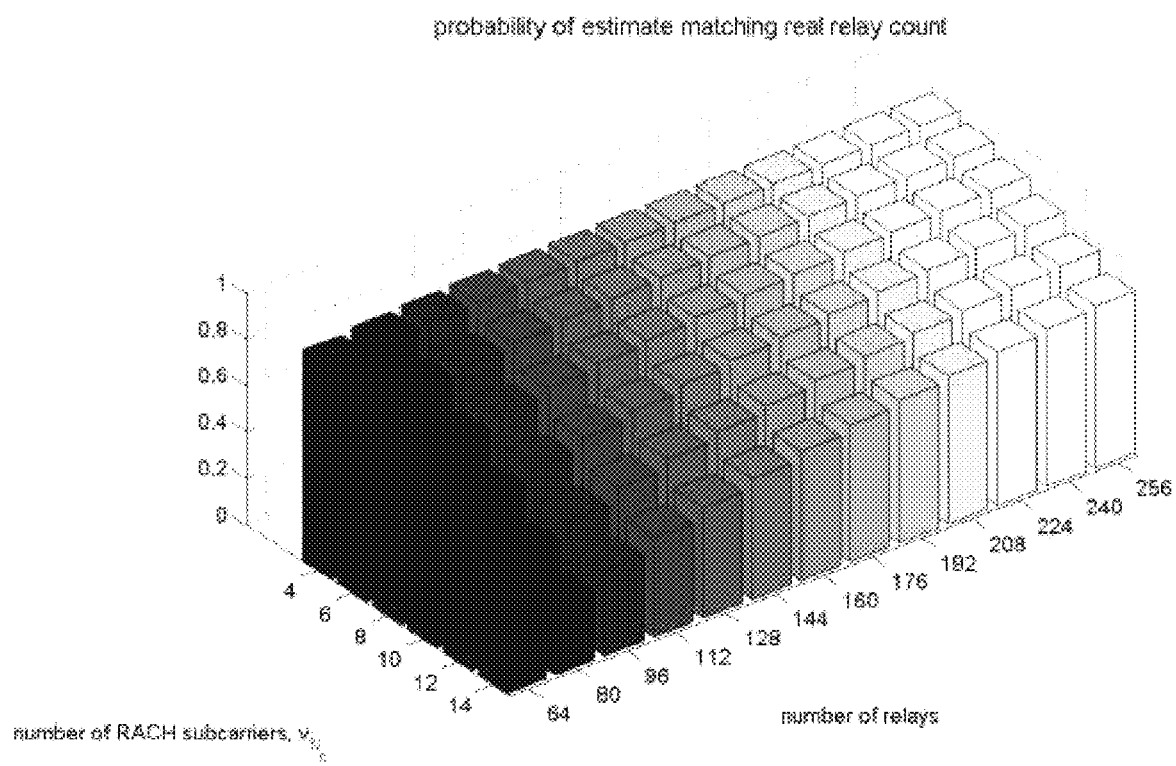
FIG. 2 shows the probability of the estimated count matching the real relay count.

Since $V_{N_c}$ is relatively large, the probability of no collision is also relatively high. In other words, the estimated count is not far from reality. This is further demonstrated in FIG. 2.

Relays modulate their position information by randomly selecting one of the designated RACH slots $b_1 \ldots b_B$, as explained in the "An Efficient Multi-Carrier Position-Based Packet Forwarding Protocol for Wireless Sensory Network," article. Nodes choosing unique slots are labelled within this context as "resolvable."

Figure 3:
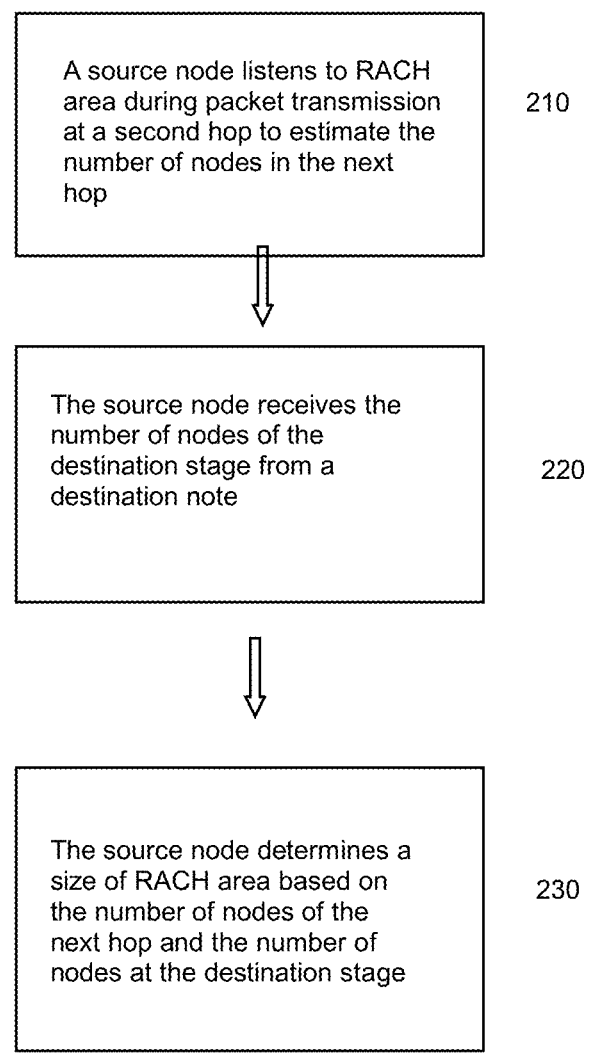
FIG. 3 is the flow chart for dynamic resource allocation.

The feature of dynamic allocation of RACH resources is discussed herein. A flowchart is shown in FIG. 3.

The size of the RACH area in terms of number of OFDM symbols is determined by the source node and is maintained throughout the packet's journey towards the destination. The number of nodes in the 2nd hop ($K_2$) as well as the last hop ($K_q$) are taken into consideration by the source node. The source node makes an estimate of $K_2$ by listening to the RACH area (e.g., receiving and detecting signals in the RACH area) during the packet transmission at the second hop. (FIG. 3, 210). As a receiver in the last hop, the destination may conveniently construct an estimate of $K_q$. The value of $K_q$ is sent back to the source in a separate packet. (FIG. 3, 220). It can be shown that through simulation that the series $$\{K_i\}_{i=1}^q$$

is generally an increasing monotone such that $$\max\{K_i\}_{i=1}^q = K_q$$

As such, knowledge of $K_2$ and $K_q$ only is sufficient for the source node on the evolution of the number of relays hop after hop.

Thus, the intensity of relays involved in forwarding the packet is a direct indication of the network node density. Consequently, the source can make an educated estimate on an optimized RACH allocation. In this invention, the source node will increase the size for the RACH area if it happens to be in a dense network. (FIG. 3, 230). This will ensure that the number of non-resolvable relays each hop is reduced. As a result, the probability of having relays which offer non-positive progress is reduced. This can be shown to result in saving energy consumed per packet. It also downsizes the interference footprint per packet particularly for narrow forwarding strip widths. This is true since adjustment in the size of the RACH area typically impact $K_i$-much more than $K_i$. In other words, it does not really affect the number relays offering positive progress. Further, the impact of those $K_i$-relays is only a small portion compared to $K_i$. As such, the number of hops q does not increase a lot. Subsequently, the end-to-end delay is only marginally affected. The dynamic allocation approach described above is suited for traffic with short length packets, e.g. video streaming. Any savings in terms of packet overhead proves to be really valuable.

Figure 4:
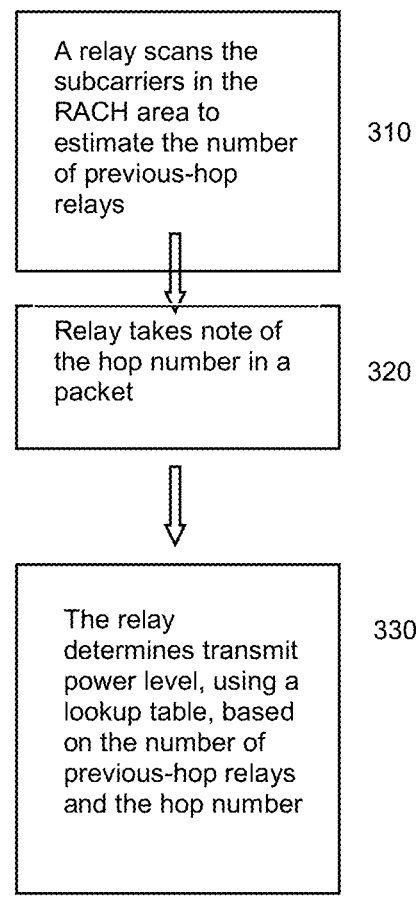
FIG. 4 is the flow chart for open-loop power control.

The feature of open-loop power control, which is performed by each relay, is discussed herein. The flow chart is shown in FIG. 4.

The first objective is that, in case of high node density, end-to-end delay target can be easily met at lower transmit power levels. Therefore, it is beneficiary to reduce power levels so as to avoid large interference footprints and consequently enhance the network throughput performance. On the other hand, in case of low node density, increasing the power level becomes mandatory to maintain the end-to-end delay within acceptable ranges.

The second objective here is to preserve energy; a precious resource for mobile terminals. Reducing transmit power reduces substantial the energy consumption causing only marginal impact on the delay performance.

A relay makes an estimate of the number of previous-hop relays by scanning the respective subcarriers within the RACH area. (FIG. 4, 310). For example, the packet is a data structure along the time dimension and the frequency dimension. The smallest unit in this packet is one time slot by one frequency subcarrier. Thus, in this example, the term "area" is defined by time-frequency unit. It also takes note of the hop number. (FIG. 4, 320). The latter is important simply because it qualifies whether a large number of relays corresponds to high density or is simply due to the packet having traversed many hops already. We recall here that the number of relays increases every hop. Using this information, the transmit power level is set based on preset look-up tables. (FIG. 4, 330). For example, the look-up table includes two columns: the first is the number of relays, the second is the transmit power corresponding to the number of relays. Generally speaking, the larger the number of relays the smaller the transmit power would be. The determination of the optimal transmit power levels is an offline task done by the network designer taking into consideration various parameters such as PHY bit rate, target packet error rate, end-to-end delay, end-to-end energy consumption, ... etc.

One aspect of present invention provides feature-based assessment of a channel. A node wishing to access the channel performs an analysis of the interference signal's features. Using such an approach, it gains valuable knowledge about its vicinity in comparison to the case where only traditional assessment techniques are used. The improved scheme increases the throughput performance and reduces of channel access delay. A direct consequence of this is the reduction of jitter, which is one of the major concerns within the context of multimedia content delivery.

Figure 5:
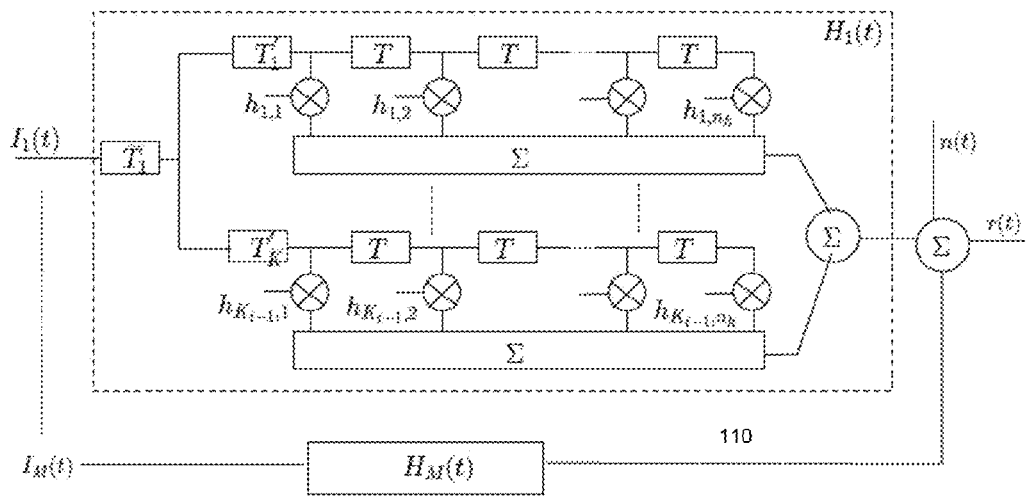
FIG. 5 illustrates a channel model of the total interference signal.
Figure 6:
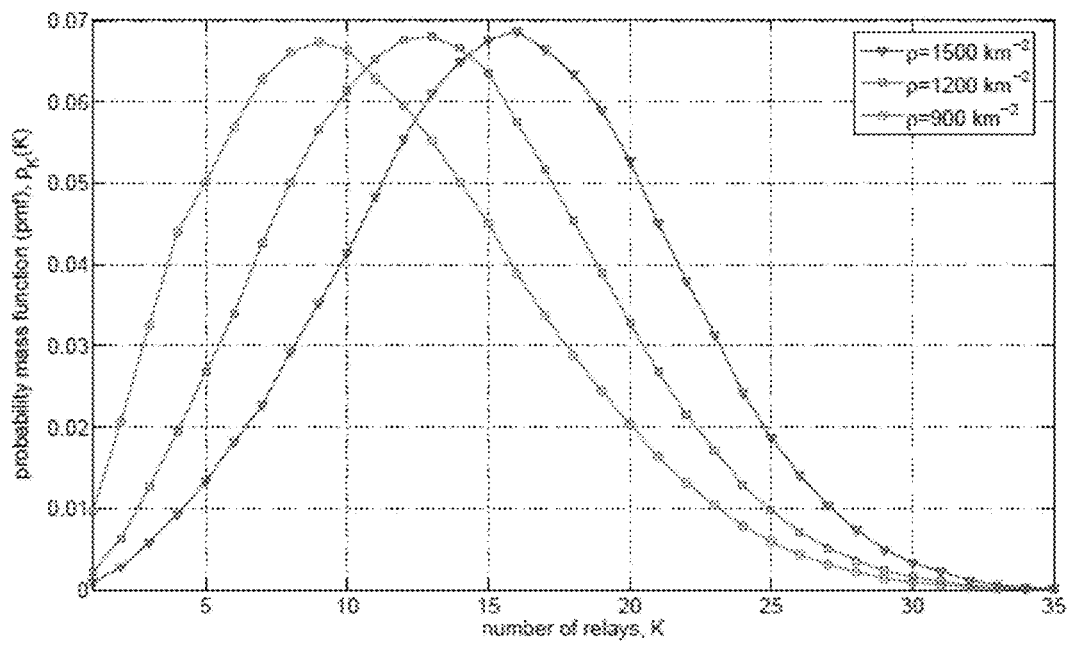
FIG. 6 shows the probability mass function for the number of relay at an arbitrary hop.

A source node assesses a channel before accessing it. A channel model is illustrated in FIG. 5. See Bader, Ahmed et al., "An Efficient Multi-Carrier Position-Based Packet Forwarding Protocol for Wireless Sensory Network," IEEE Transaction on Wireless Communications, Volume 11, no. 1 (January 2012), the content of which is incorporated by reference in its entirety. Very often, the observing node (the source node) will lie in the vicinity of a packet transmission featuring a large number of relays. Under such circumstances, the features of the resulting total interference signal are dominated by that transmission. In fact, it is quite likely to be in such a situation. The probability mass function (PMF) of the number of relays per transmission is plotted in FIG. 6 for various node densities. As illustrated in the figure, transmissions with large K are quite probable particularly at higher node densities. Under such circumstances, the total interference signal will show noticeable correlation across the frequency domain. Such a correlation is best captured by the observing node by computing the normalized auto-covariance of the power spectral density (PSD) of the total interference signal. This can be conveniently accomplished by exploiting the fact that nodes readily deploy Fast Fourier Transform (FFT) circuits which are required for the operation of the OFDM PHY. There are various algorithms in practice for the computation of the FFT. However, they are almost all based around the Discrete Fourier Transform (DFT) which is a well-known algorithm. The normalized auto-covariance is computed by the observing node as follows:

$$X_{cov}(c) = \begin{cases} \dfrac{1}{X_o} \sum_{n=0}^{N_s-c-1} (P_I(n+c) - \overline{P_I}), & c = 0 \ldots N_s - 1 \\ (P_I(n) - \overline{P_I}) \\ X_{cov}(-c), & c = -N_s \ldots 0 \end{cases} \quad (1)$$

-continued where $$\overline{P}_I = \frac{1}{N_s} \sum_{i=0}^{N_s-1} P_I(i)$$

and $$X_o = \sum_{n=0}^{N_s-1} (P_I(n) - \overline{P}_I)^2.$$

Figure 7A:
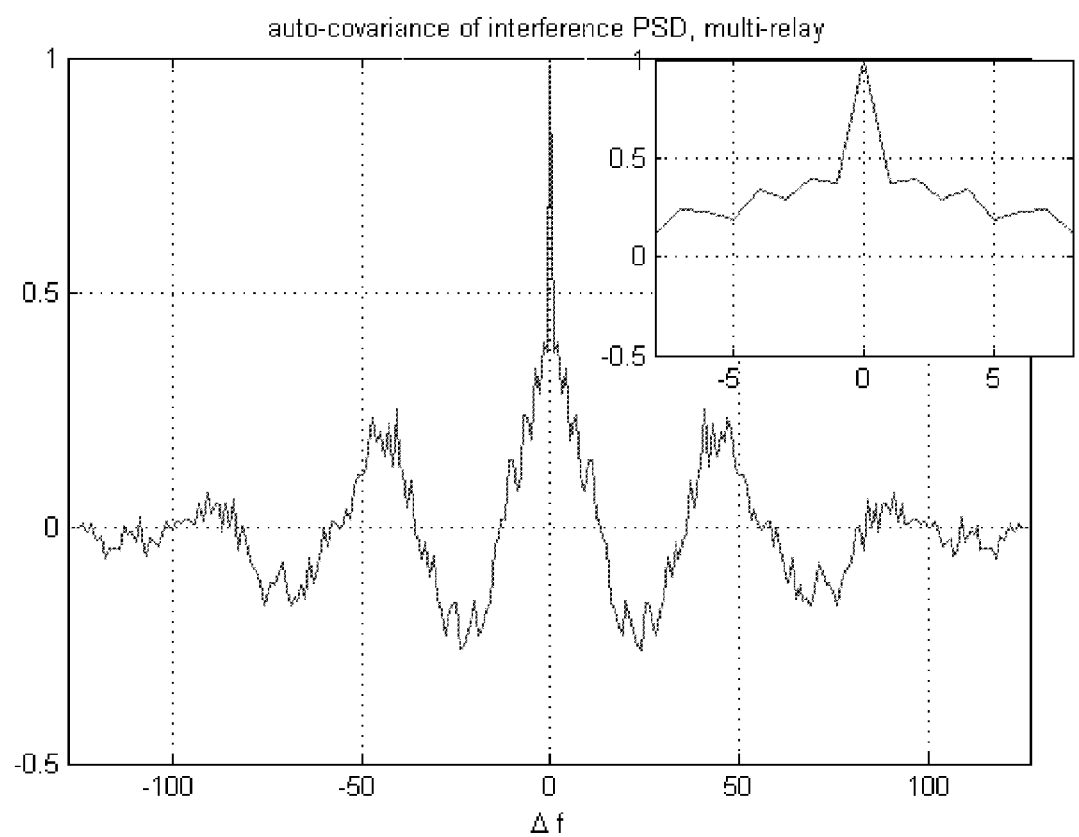
FIG. 7a illustrates sample realization of the interference-plus-noise auto-covariance of the power spectral density (PSD) in a multi-relay case.
Figure 7B:
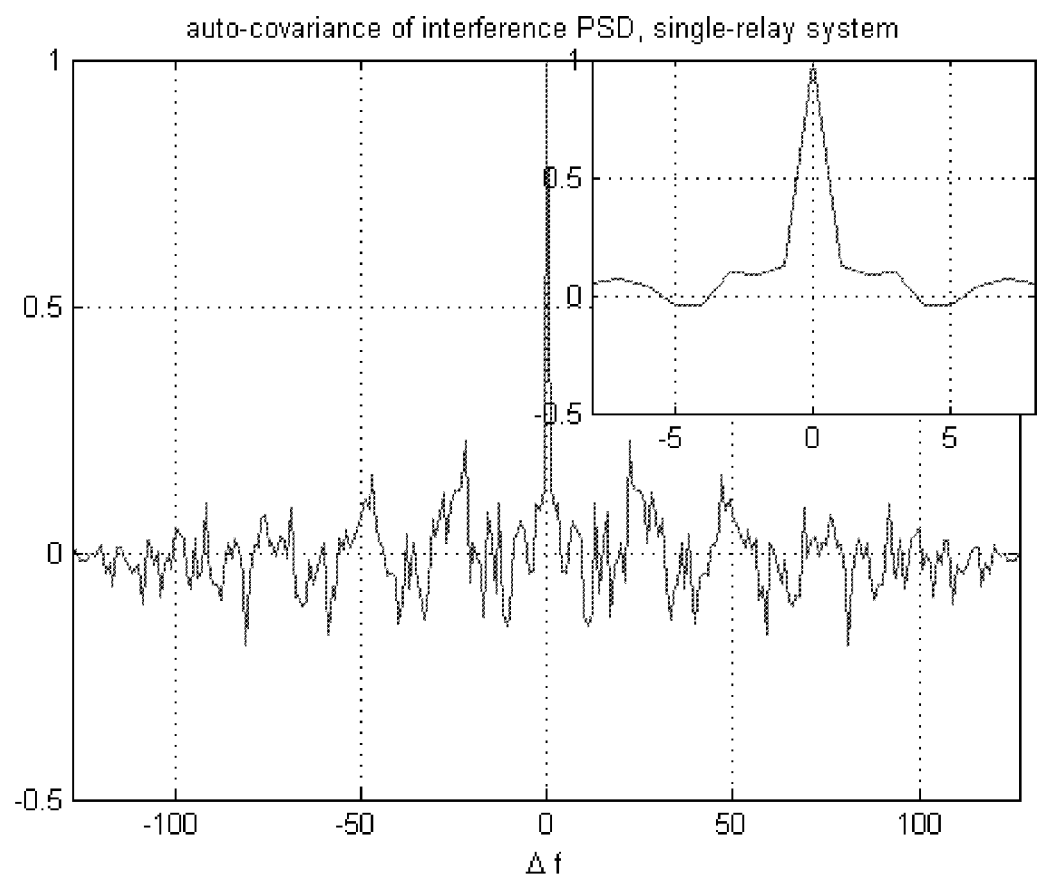
FIG. 7b illustrates sample realization of the interference-plus-noise auto-covariance of the power spectral density (PSD) in a single-relay case

In contrast, the interference PSD in the case of single-relay systems features very low correlation across the frequency domain. In fact, the more concurrent single-relay transmissions there are, the less correlation is observed. Sample realizations of the interference PSD for both cases are shown in FIGS. 7a and 7b.

A simple yet effective characterization of the correlation featured by $X_{COV}$ is the first zero-crossing. The larger the number of relays K is, the larger this zero-crossing is expected to be. The improved scheme developed in this invention further introduces an additional feature. The busy tone (BT) signal is conventionally a continuous analog signal. In our case, the BT signal is modulated with the position of the destination node.

Figure 8:
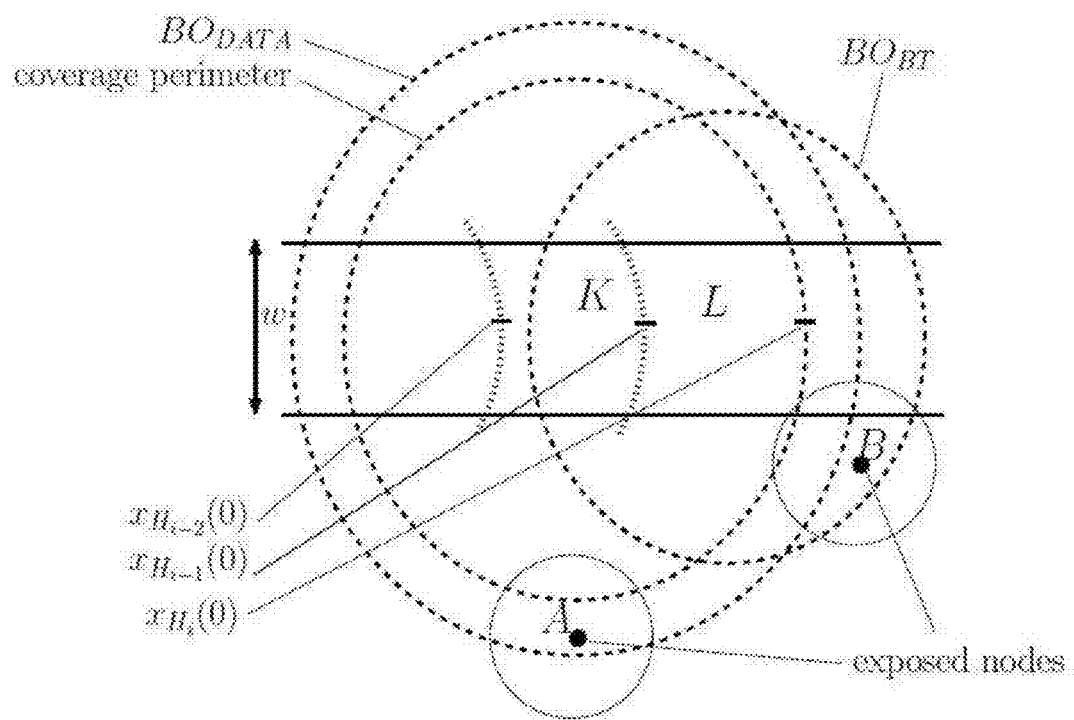
FIG. 8 illustrates the scheme for exposed nodes to capture more transmission opportunities.

The ability of the observing node to detect the presence of a "large-K" transmission and to know the destination of that transmission opens the door wide for more channel access opportunities. This is illustrated in FIG. 8. An exposed node utilizing classical channel assessment schemes will refrain from accessing the channel if it lies inside the back-off zone. The back-off zone is composed of two subzones, $BO_{DATA}$ and $BO_{BT}$, corresponding to the data tones back-off zone and busy tone back-off zone respectively. This is true even if the node lies outside the coverage perimeter of the nearby packet transmission. This is where feature detection lends itself to a more opportunistic channel access process.

In one aspect of present invention, a node determines whether it is in a back-off zone by means of an "energy detector." For the data tones back-off zone, the energy detector measures the aggregate energy level on those tones, outputs the average and compares it to a preset threshold. If larger than the threshold, the node decides that it is inside the data tones back-off zone.

An exposed node utilizing the improved assessment scheme of this invention first measures the PSD at the output of the FFT block. It then computes the first zero-crossing, denoted by $n_{f_o}$, of $X_{COV}$. Denoting the decision threshold by $n_T$, then if $n_{f_o} > n_T$ the node declares the channel as being one with a large number of relays.

The threshold $n_T$ setting depends on few factors such as the typical traffic load, node density, large-scale path loss coefficient, among other parameters. One way to set the threshold at a meaningful value is by means of simulations. One aspect of present invention provides that for typical network scenarios, setting $n_T=6$ is a reasonable choice.

Accordingly, it knows that injecting a new packet into the network is unlikely to interfere with the ongoing nearby transmission. At the same time, it is likely to find a few potential receivers. Such a scenario is applicable to node A in FIG. 8. Here, w is the forwarding strip width. L is the number of receivers for that packet transmission. As such, the number of nodes energizing the busy tone is also L. The coverage perimeter is simply the perimeter of the geographical area where the packet transmission can be received correctly. Additional information may be found in the incorporated "An Efficient Multi-Carrier Position-Based Packet Forwarding Protocol for Wireless Sensory Network" article.

For node B however, the improved algorithm introduces an additional stage in the decision-making process. Node B might not be able to properly characterize the PSD of the interference signal, since it lies outside $BO_{DATA}$. Nevertheless, it will be able to extract the position of the transmission's destination. The angle between the observing node's destination and that of the ongoing transmission is denoted by $\Delta\Theta_{dst}$. The observing node decides to transmit if $|\Delta\Theta_{dst}| > \pi/2$.

The various decision-making cases for this improved channel assessment scheme are highlighted in Table I below:

TABLE I

DECISION TABLE FOR CHANNEL ACCESS

| Case | in $BO_{DATA}$ | in $BO_{BT}$ | Large K | Prior Art | Improved Scheme |
|---|---|---|---|---|---|
| 1 | n | n | n | transmit | transmit |
| 2 | n | n | y | transmit | keep listening to the channel for a period < T, then re-assess, |
| 3 | n | y | — | back off | extract destination position from the BT signal if $\Delta\theta_{dst} > \frac{\pi}{2}$ then transmit, otherwise back off |
| 4 | y | n | n | back off | back off |
| 5 | y | n | y | back off | transmit |
| 6 | y | y | n | back off | back off |
| 7 | y | y | y | back off | back off |

Case 3 of Table I may occur in lightly-loaded networks. For the sake of extracting the position of the destination, the observing node needs to switch from simple energy detection to coherent channel assessment. The node needs to synchronize with the BT signal in that case.

For Case 2, the packet flow is very likely to be moving away from the observing node. For a higher degree of confidence, it may be possible to extend the channel sensing activity for a few more samples (extended period) and then re-assess.

What is claimed is:

1. A multihop network having a plurality of nodes relaying data, comprising:
   a source node;
   one or more relay nodes; and
   a destination node,
   wherein the source node is configured to listen to a packet transmissions at a second hop and estimate a number of relay nodes in the second hop by:
   synchronizing with an ongoing second hop transmission of a packet;

extracting values pertaining to a group of subcarriers $v_1$-$v_{N_c}$ listed in a RACH area of the packet; and detecting those subcarriers in the group of subcarriers $v_1$-$v_{N_c}$ whose energy content crosses a preset threshold, wherein the estimate of the number of relay nodes $K_2$ in the second hop correspond to a number of the subcarriers in the group that crossed the preset threshold, wherein the destination node is configured to receive the packet and send an estimate a number of relay nodes $K_q$ in a last hop to the source node by:

extracting values pertaining to the group of subcarriers listed in the RACH area of the packet; and detecting those subcarriers in the group of subcarriers whose energy content crosses a preset threshold, wherein the estimate of the number of relay nodes in the last hop correspond to a number of the subcarriers in the group that crossed the preset threshold, wherein the source node is further configured to optimize a size of the RACH area based on at least a comparison of the estimate of the number of relay nodes in the second hop with the number of relay nodes in the last hop.

2. The multihop network of claim 1, wherein the RACH area further includes position information of a node that transmitted the packet in a previous hop.

3. The multihop network of claim 1, wherein the one or more relay nodes is configured to randomly select one of the RACH area subcarriers.

4. The multihop network of claim 3, wherein the one or more relay nodes modulate the selected subcarrier with a signal containing position information.

5. The multihop network of claim 1, wherein the source node is further configured to decrease the number of the subcarriers in the group of subcarriers listed in the RACH area if the estimate of the number of relay nodes in the last hop is indicative of a dense multihop network.

6. The multihop network of claim 5, wherein the source node is further configured to decrease transmit power to reduce interference in the multihop network if the estimate of the number of relay nodes in the last hop is indicative of a dense multihop network.

7. The multihop network of claim 1, wherein the source node is further configured to increase the number of the subcarriers in the group of subcarriers listed in the RACH area if the estimate of the number of relay nodes in the last hop is not indicative of a dense multihop network.

8. The multihop network of claim 7, wherein the source node is further configured to decrease transmit power to reduce interference in the multihop network if the estimate of the number of relay nodes in the last hop is indicative of a dense multihop network.

9. The multihop network of claim 1, wherein the source node is further configured to decrease transmit power to reduce interference in the multihop network if the estimate of the number of relay nodes in the last hop is indicative of a dense multihop network.

10. The multihop network of claim 1, wherein the source node is further configured to decrease transmit power to reduce interference in the multihop network if the estimate of the number of relay nodes in the last hop is indicative of a dense multihop network.

11. The multihop network of claim 10, wherein a transmit power level is determined based on a lookup table.

12. A communication system comprising:

a source node configured to transmit data in a multihop network, wherein the data includes a packet including a RACH area; and wherein the packet includes a hop number corresponding to a current number of times that the packet has been transmitted before reaching a destination node; and at least one relay node that is configured to receive the data and increment the hop number in the packet before transmitting the data on a path towards the destination node, wherein the at least one relay node is further configured to listen to packet transmissions at a previous hop and estimate a number of relay nodes in the previous hop by:

synchronizing with an ongoing subsequent hop transmission of a packet;

extracting values pertaining to a group of subcarriers $v_1$-$v_{N_c}$ listed in a RACH area of the packet; and detecting those subcarriers in the group of subcarriers $v_1$-$v_{N_c}$ whose energy content crosses a preset threshold, wherein the estimate of the number of relay nodes K in the previous hop correspond to a number of the subcarriers in the group that crossed the preset threshold, wherein the at least one relay node is further configured to optimize a value of a transmit power level based on the estimate of the number of relay nodes K in the previous hop and the hop number.

13. The communication system of claim 12, wherein the RACH area further includes position information of a communication device that previously transmitted the data, wherein the communication device comprises the source node or the at least one relay node.

14. The communication system of claim 12, wherein a communication device transmits the data including the packet, and randomly selects one of the subcarriers, wherein the communication device comprises the source node or the at least one relay node.

15. The communication system of claim 14, wherein the communication device modulates the selected subcarrier with a signal containing positioning data of the communication device.

16. The communication system of claim 15, wherein the signal is a time-domain signal.

17. The communication system of claim 14, wherein the communication device is a wireless communication device.

18. The communication system of claim 17, wherein the communication device is an OFDM wireless communication device.

19. The communication system of claim 14, wherein the communication device scans the subcarriers after receiving the data including the packet.

20. The communication system of claim 12, wherein the at least one relay node is further configured to decrease transmit power to reduce interference in the multihop network if the estimate of the number of relay nodes in the previous hop and the hop number are indicative of a dense multihop network.

21. The communication system of claim 12, wherein the at least one relay node is further configured to increase transmit power to reduce interference in the multihop network if the estimate of the number of relay nodes in the previous hop and the hop number are not indicative of a dense multihop network.

22. The communication system of claim 12, wherein the transmit power level is determined based on a lookup table.

23. A method for operating a multihop network, comprising:

formatting, by a source node, a packet that includes a dedicated field containing a hop number corresponding to a current number of times that the packet has been transmitted before reaching a destination node, wherein the packet further includes a RACH area;

transmitting, by the source node, the packet including the RACH area and the hop number;

receiving, by a relay node, the packet;

incrementing, by the relay node, the hop number contained in the packet;

transmitting, by the relay node, the packet on a path towards the destination node;

listening, by the relay node, to packet transmissions at a previous hop and estimating a number of relay nodes in the previous hop by:

extracting values pertaining to a group of subcarriers $v_1$-$v_{N_c}$ listed in a RACH area of the packet; and detecting those subcarriers in the group of subcarriers $v_1$-$v_{N_c}$ whose energy content crosses a preset threshold, wherein the estimate of the number of relay nodes K in the previous hop correspond to a number of the subcarriers in the group that crossed the preset threshold; and optimizing, by the relay node, a value of a transmit power level based on the estimate of the number of relay nodes K in the previous hop and the hop number.

24. The method according to claim 23, wherein the RACH area further includes position information of a communication device that previously transmitted the data, wherein the communication device comprises the source node or the relay node.

25. The method according to claim 24, wherein the communication device is a wireless communication device.

26. The method according to claim 25, wherein the communication device is an OFDM wireless communication device.

27. The method according to claim 23, further comprising:

selecting randomly, by a communication device in the multihop network, one of the subcarriers, wherein the communication device comprises the relay node.

28. The method according to claim 27, further comprising:

modulating, by the communication device, the selected subcarrier with a signal containing positioning data of the communication device.

29. The method according to claim 28, wherein the signal is a time-domain signal.

30. The method according to claim 28, further comprising:

scanning, by the communication device, the subcarriers.

31. The method according to claim 30, wherein the communication device scans the subcarriers for energy levels.

32. The method according to claim 23, further comprising decreasing, by the relay node, a transmit power level to reduce interference in the multihop network if the estimate of the number of relay nodes in the previous hop and the hop number are indicative of a dense multihop network.

33. The method according to claim 23, further comprising increasing, by the relay node, a transmit power level to reduce interference in the multihop network if the estimate of the number of relay nodes in the previous hop and the hop number are indicative of a dense multihop network.

34. A source node in a multihop network, comprising:

a first circuit of the source node that is configured to listen to a RACH area during a packet transmission at a second hop and estimate a number of relay nodes in the second hop by detecting those subcarriers listed in the RACH area whose energy content crosses a preset threshold;

a second circuit of the source node that is configured to receive a number of relay nodes at a destination stage transmitted by a destination node of the packet transmission, wherein the number of relay nodes is an estimate of a number of relay nodes in the packet transmission at a last hop; and a third circuit of the source node that is configured to set a size of the RACH area based on a comparison of the estimates of the number of nodes of the second hop and the number of nodes at the destination stage, wherein the source node transmits a packet having a RACH area at the determined size.

35. The source node according to claim 34, wherein the size of the RACH area is constant for a plurality of hops.

36. A method to dynamically allocate a size of a RACH area of a packet, comprising:

listening, by a source node of a multihop network, a RACH area during a packet transmission at a second hop;

estimating, by the source node of the multihop network, a number of relay nodes at the second hop by detecting those subcarriers listed in the RACH area whose energy content crosses a preset threshold;

receiving, by the source node, a number of relay nodes at a destination stage transmitted by a destination node of the packet transmission, wherein the number of relay nodes is an estimate of a number of relay nodes in the packet transmission at a last hop;

determining, by the source node, a size of the RACH area based on a comparison of the estimates of the number of nodes of the second hop and the number of nodes at the destination stage; and transmitting, by the source node, a packet having a RACH area at the determined size across the multihop network.

37. The method according to claim 36, wherein the RACH area is constant for all hops.

38. A relay of a multihop network, comprising:

a first circuit of a relay node that scans subcarriers in a RACH area to estimate a number of previous hop relays by detecting those subcarriers listed in the RACH area whose energy content crosses a preset threshold;

a second circuit of the relay node that receives a packet including a hop number corresponding to a current number of times that the packet has been transmitted on a path towards a destination node; and a third circuit of the relay node that sets a transmit power level for the relay node based on the estimate of the number of previous hop relays and the hop number.

39. The relay according to claim 38, wherein the transmit power level is determined based on a lookup table.

40. A method for open-loop transmit power control, comprising:

scanning, by a relay node in a multihop network, subcarriers in a RACH area;

detecting those subcarriers listed in the RACH area whose energy content crosses a preset threshold;

estimating, by the relay node, a number of previous hop relay nodes based on a number of those subcarriers whose energy content crosses the preset threshold;

receiving, by the relay node, a packet including a hop number corresponding to a current number of times that the packet has been transmitted on a path towards a destination node;

determining, by the relay node, a value of a transmit power level based on the estimate of the number of previous hop relay nodes and the hop number; and setting, by the relay node, the transmit power level of the relay node to the determined value.

41. The method according to claim 40, wherein the transmit power level is determined based on a lookup table.

\* \* \* \* \*